June 28, 1932.        C. M. OSTERHELD        1,865,332
CONTROL DEVICE
Filed May 22, 1929
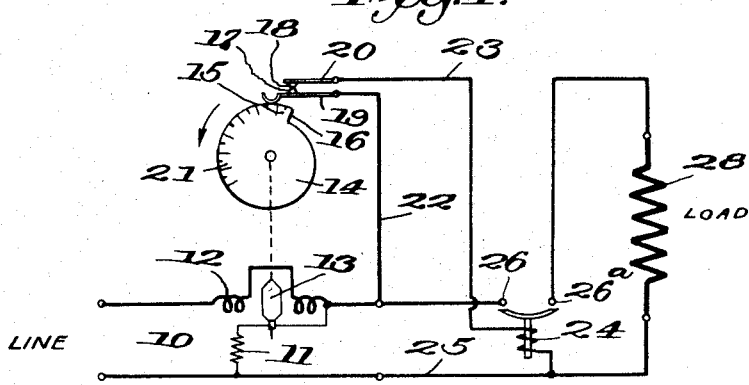
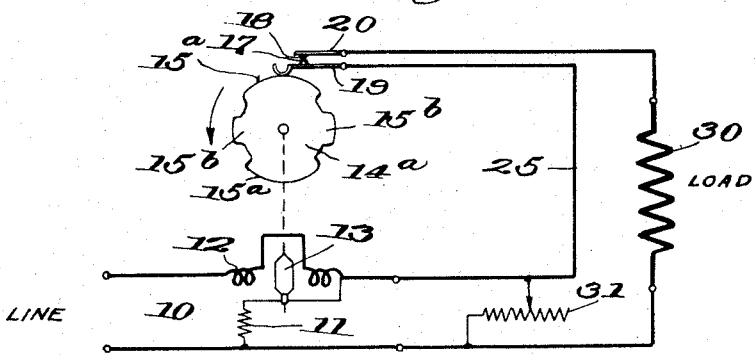
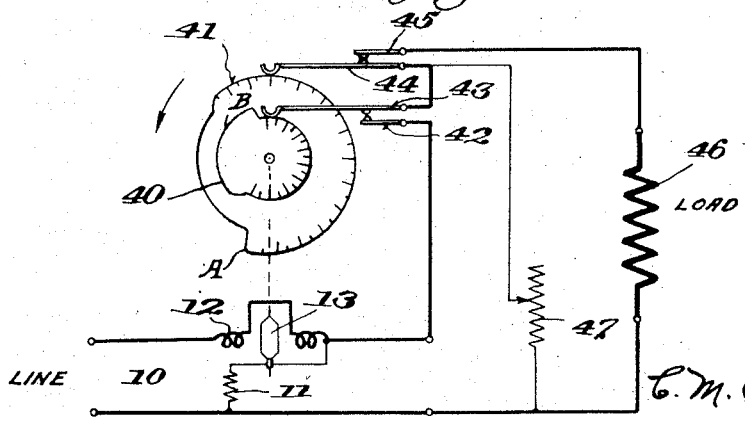
Inventor
C. M. Osterheld
By Stone, Boyden, Mack & Kiehn
Attorneys Patented June 28, 1932

1,865,332

UNITED STATES PATENT OFFICE

CLARK M. OSTERHELD, OF STOUGHTON, WISCONSIN, ASSIGNOR, BY MESNE ASSIGNMENTS, TO WATERS-GENTER COMPANY, OF MINNEAPOLIS, MINNESOTA, A CORPORATION OF MINNESOTA

CONTROL DEVICE

Application filed May 22, 1929. Serial No. 365,219.

This invention relates to electric control devices and has particular reference to control devices for electrical equipment such as toasters, ranges, water heaters, annealing ovens, refrigerators and similar equipment.

Heretofore electrical equipment of this general character has been controlled either by a thermostat, or a time switch, or a combination of both to discontinue the operation of the unit after the desired result has been accomplished. This type of control operates satisfactorily as long as the line voltage remains constant; however, in actual practice the line voltage fluctuates in accordance with the load and during the peak or rush hours, the voltage will drop considerably below normal, while at other times when the load is light, the voltage will climb considerably above normal. As an example, the normal 110 volt line will vary between 105 and 115 volts and often between wider limits.

This variation in line voltage seriously affects the operation of electrical units employing resistances for producing heat, as a small variation in voltage will cause a corresponding variation in current consumed, and hence in a given time there will be a wide variation in watts consumed with the result that the number of B. t. u. available from the resistance will vary over a considerable range. The result obtained therefore with time controlled mechanism is not uniform as the time control remains constant irrespective of the variations in line voltage.

As a specific example illustrating this point, the operation of a time controlled toaster will be considered. The operator sets the timing mechanism to cut off the current after a predetermined time which is determined by the moisture content and composition of the bread being toasted. The toaster operates satisfactorily for a time but as the rush hour approaches and the load on the line increases, the voltage drops and hence the electric heating elements do not consume the same number of watts nor to they radiate the same number of B. t. u. The time control mechanism, however, remains constant and the result is that the current is cut off before the toast is done. In order to compensate for this, it is necessary for the operator to readjust the time control mechanism and allow more time for toasting the bread. As the rush hour passes, the voltage of the line rises and the result is now that the toast is burned due to the greater number of watts consumed in a given time and more B. t. u. are radiated by the heating elements. This variation in line voltage therefore seriously affects the operation of electrical units which are automatically controlled and renders such automatic control unreliable as the same result cannot be produced each time.

It is the primary object of the present invention to provide a control device which shall automatically operate the electrical unit so as to produce the same result each time the unit is put in operation irrespective of changes in line voltage.

Another object is to provide a control device, the operation whereof shall be based on the electrical energy consumed by the unit so that all constant timing devices such as clock works shall be eliminated and the time of operation shall be variable and dependent on the energy consumed by the unit.

A further object is to provide a control device which may be constructed to operate intermittently so that the current will be turned on and off at predetermined times and a given result produced irrespective of variations in line voltage.

A still further object is to provide a control of this general character which shall be simple in construction, inexpensive to manufacture, efficient in operation, and which may be easily attached to, or incorporated in various electrical units to automatically control the same.

The foregoing and other objects and advantages will become more apparent as the description proceeds.

In the drawing accompanying and forming part of this application:

Fig. 1 is a diagrammatic view illustrating one form of my invention wherein the operator starts the device and the operation thereof is automatically interrupted after a predetermined result is accomplished.

Fig. 2 is a similar view but illustrating a control device which automatically starts and stops the operation of an electrical unit so that the same will operate in intermittent cycles, and Fig. 3 is a similar view but illustrating a further modification wherein an electrical time control automatically starts operation of the unit as a predetermined time and an energy control stops the operation of the unit after a predetermined amount of electrical energy has been consumed.

Referring particularly to Fig. 1, 10 denotes generally a watt hour meter having a voltage or potential coil 11, a current coil 12 and a rotatable member 13 which moves in accordance with the number of watts flowing in the circuit in which the device is hooked. Connected with the rotatable element, either by direct connection or through a suitable gear train, (not shown), is a cam 14 that is formed with a toe 15 and a notch 16, and cooperating with this cam are two contacts 17 and 18. Contact 17 is carried by a movable arm 19 which engages the cam, while contact 18 is carried by a stationary arm 20. With this arrangement, it will be apparent that rotation of cam 14 will allow arm 19 to drop in notch 16 and separate contacts 17 and 18. Continued rotation of the cam will cause the arm 19 to move toward the arm 20 and engage contacts 17 and 18 which remain closed until arm 19 again drops into notch 16.

Cam 14 is preferably graduated in any suitable manner as for example as indicated at 21 and the connection between the cam and its driving member is made manually adjustable in any approved manner (not shown) so that the operator may set the cam to rotate a predetermined distance and then cause contacts 17 and 18 to separate.

Contact 17 is connected by a wire 22 to one of the output terminals of the watt meter and contact 18 is connected by a wire 23 to one side of a winding 24 of a relay. The other side of the relay winding is connected to the other output terminal of the watt meter through wire 25. The relay contacts 26 and 26a are adapted to be bridged by a contact arm 27 when the relay winding is energized and these contacts are arranged in series circuit with the load 28 to be controlled.

In use, the operator manually adjusts cam 14 by means of graduations 21 to the desired position, thereby closing contacts 17 and 18 and completing the circuit from one side of the line, through the current coil 12 of the watt meter, wire 22, contacts 17 and 18, wire 23, relay winding 24, wire 25 and the watt meter to the other side of the line. The relay is energized to bridge contacts 26 and 26a thereby energizing the heating unit or other load 28. Current flowing in this circuit will rotate the armature of the wattmeter and hence rotate cam 14 until the contacts 17 and 18 are opened as described above. The time of opening these contacts and thereby de-energizing the relay winding to open the contacts 26, 26a and hence disconnect the heating unit 28 from the source of current will depend on the line voltage. If the line voltage is high, the wattmeter will rotate faster than if the line voltage is normal and hence the heater unit will be cut out of the circuit in a shorter period of time than if the voltage is normal. In a similar manner, if the line voltage is below normal the heater unit will be in circuit a longer period of time due to the slower rotation of the wattmeter. In either case the number of watts transmitted to, and consumed by the heating unit 28 is the same irrespective of fluctuations in line voltage, hence in all cases the result obtained will be identical as the same number of B. t. u. will be radiated by the unit.

In Fig. 2 I have illustrated a modified form of device wherein a given number of watts is to be consumed by the load 30 and then the circuit is to be interrupted for a period of time, after which the same or a different number of watts is to be consumed again, thus providing an intermittent form of operation comprising a number of cycles. In this form of my invention, the wattmeter and associated parts are designated by the same reference numerals as previously described as such parts are identical. The cam 14a is fitted with broadened toe portions 15a and narrower toe portions 15b that hold the contacts 17 and 18 in closed position, while the remaining surface of the cam allows the contacts to remain open. Shunted across the output terminals of the wattmeter is a variable resistance 31 which may be adjusted to cause the wattmeter to creep or rotate at any desired speed. This form of device will find many useful applications, as for example an absorption type of refrigerator. The number of watts required for the load 30, and the time such load is to be disconnected from the line is to be determined by the manufacturer and the cam 14a designed accordingly. Slight adjustments may be made by the operator by adjusting variable resistance 31 to vary the time the load is disconnected from the line if desired. In use, the load will consume a definite number of watts irrespective of line voltage fluctuations, and then be disconnected from the line. The creeping coil or resistance 31 being permanently shunted across the output terminals of the wattmeter causes said meter to continue to rotate even though the load is disconnected. When the cam has been rotated a given distance by the creeping coil 31, the contacts 17 and 18 will again close and the load 30 will be energized again. Thus the device operates in cycles without danger of burnout or insufficient energy due to line voltage fluctuations and the result produced is the same each cycle of operation. Such type of device will be also useful for many other purposes, as for example water heaters, annealing ovens, and similar devices.

In the form shown in Fig. 2, I have illustrated the contacts 17 and 18 as the means for making and breaking the main load circuit. If the load consumes considerable current which would tend to cause these contacts to arc or spark a relay could be used for making and breaking the circuit as shown in Fig. 1 without departing from the spirit of my invention.

In Fig. 3, I have illustrated a further modification of my invention which allows the operator to adjust the mechanism to close a circuit at a predetermined time and operate to consume a predetermined number of watts and then shut off. Such apparatus being particularly useful for electric ranges where it is desired to start a cooking operating at some given time and carry out the cooking and then shut off the current.

In this form of apparatus the wattmeter 10 drives a double cam, one of which is indicated at 40 and the other at 41. Cam 40 has associated therewith a pair of contacts 42 and 43, while cam 41 has a similar pair of contacts 44 and 45. These contacts are in series circuit with each other and also in series circuit with one side of the load 46 and an output terminal of the wattmeter. Shunted across contact 43 and the other output terminal of the wattmeter is a variable resistance or creeping coil 47. The operator, by suitable graduations in cam 40, adjusts said cam to a predetermined position corresponding to the time at which the load is to be energized. In a similar manner, cam 41 is adjusted with respect to cam 40, by means of suitable graduations thereon, to a position which determines the number of watts of electricity to be consumed by the load 46 for the particular cooking operation to be effected. When the operator adjusts cam 40, the contacts 42 and 43 are closed, thereby connecting the creeping coil 47 across the wattmeter output terminals. This false load causes the wattmeter to rotate, thereby rotating cams 40 and 41 simultaneously. After a predetermined degree of rotation, the contact spring rides up on the enlargement on cam 41 and causes contact 44 to engage contact 45 thereby completing the circuit through the load 46. Current flows through the load 46 to supply a predetermined number of watts thereto irrespective of line voltage fluctuation and after this predetermined amount of energy has been consumed, the cams 40 and 41 will have rotated to a point to allow the spring carrying contact 44 to drop off the shoulder A and thereby allow contacts 44 and 45 to open. Meanwhile contact spring 43 will have ridden up on the toe B of cam 40 and caused contacts 42 and 43 to open, thereby cutting the entire system off the line.

The function of the variable resistance or creeping coil 47 is to allow the device to be adjusted to suit each locality to obtain an average of the voltage fluctuations encountered so that the error in time in actuating the device due to such fluctuations will be relatively small and of a negligible character.

What I claim is:—

1. A control device of the character set forth comprising a watt meter having input terminals connected to a source of electrical energy and output terminals connected to a circuit to be controlled, a switch operatively connected to the movable member of said watt meter and actuated in accordance with the electrical energy flowing in said circuit, a load interposed in said circuit and adapted to be connected to and disconnected from said circuit by said switch, and means shunted across the output terminals of said watt meter and adapted to cause a flow of energy therethrough during the period said load is disconnected from the circuit.

2. A control device of the character set forth comprising a watt meter having input terminals connected to a source of electrical energy and output terminals connected to the circuit to be controlled, a cam operatively connected with the movable member of said watt meter, contacts associated with said cam and actuated thereby, a load interposed in said circuit and connected through said contacts with the output terminals of said watt meter, and an adjustable auxiliary load shunted across the output terminals of said watt meter.

3. A control device of the character set forth comprising a watt meter having input terminals connected to a source of electrical energy and output terminals connected to the circuit to be controlled, a plurality of cams operatively connected with the movable member of said watt meter, contacts associated with each of said cams and actuated thereby to open and close the circuit, and a load connected through each pair of contacts to the output terminals of said watt meter.

4. A control device of the character set forth comprising a watt meter having input terminals connected to a source of electrical energy and output terminals connected to the circuit to be controlled, a plurality of cams operatively connected with the movable member of said watt meter, said cams being adjustable with respect to each other and with respect to said movable member, contacts associated with each of said cams and actuated thereby to open and close the circuit, and a load connected through each pair of contacts to the output terminals of said watt meter.

5. A control device of the character set forth comprising a watt meter having input terminals connected to a source of electrical energy and output terminals connected to the circuit to be controlled, cams operatively connected with the movable member of said watt meter, contacts associated with said cams and actuated thereby to open and close the circuit in definite cycles, and a load connected through said contacts to the output terminals of said watt meter.

6. A control device of the character set forth comprising a watt meter having input terminals connected to a source of electrical energy and output terminals connected to the circuit to be controlled, a plurality of cams operatively connected with the movable member of said watt meter, said cams being adjustable with respect to each other, contacts associated with said cams and actuated thereby to open and close the circuit in definite predetermined cycles, and a load connected through said contacts to the output terminals of said watt meter.

In testimony whereof I affix my signature.

CLARK M. OSTERHELD.